April 9, 1957 R. A. JUMISCO 2,787,896
TORSIONAL VIBRATION DAMPER
Filed Dec. 18, 1953 2 Sheets-Sheet 1

INVENTOR
Roy A. Jumisco
BY L. D. Burch
ATTORNEY

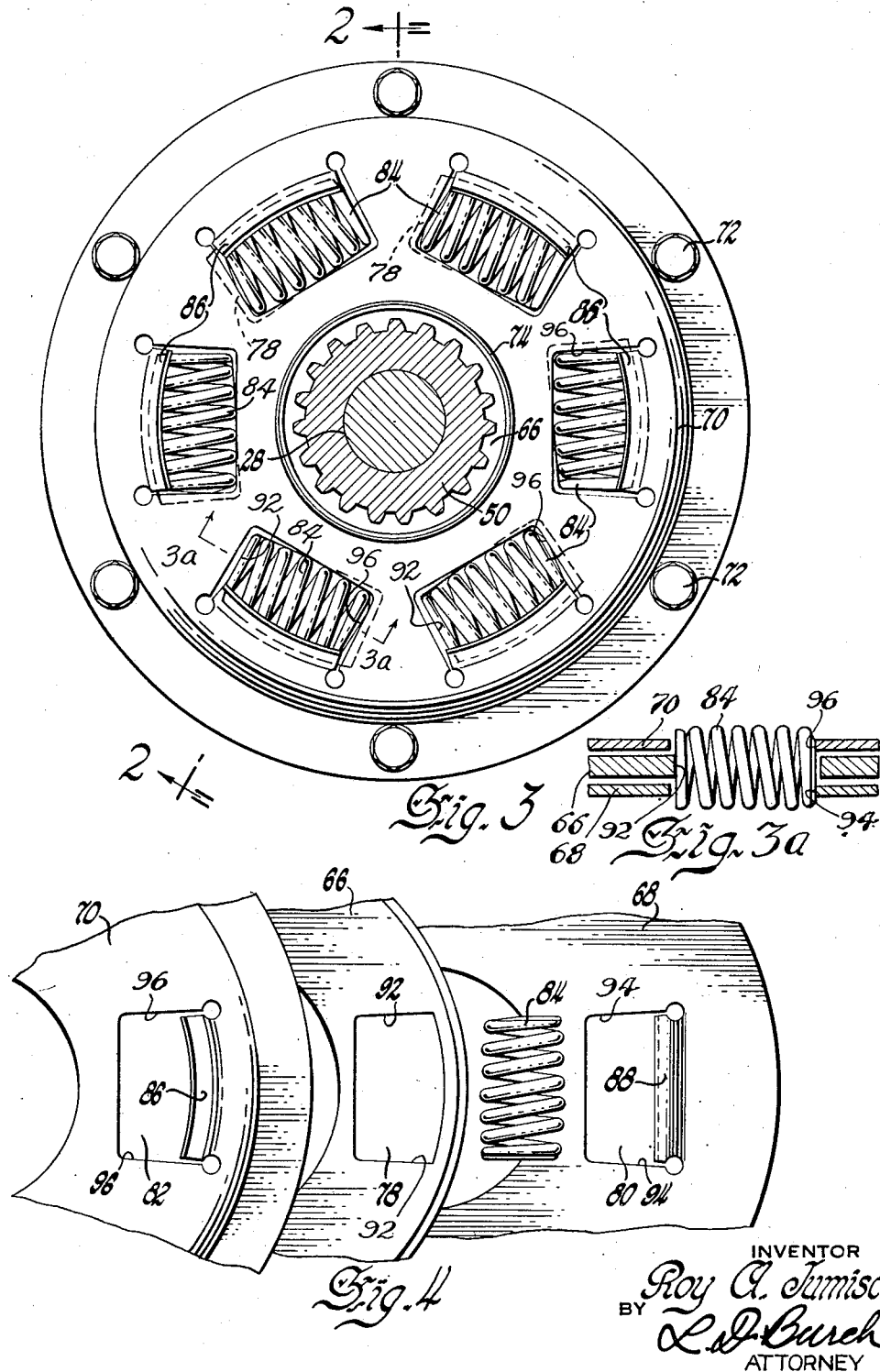

United States Patent Office 2,787,896
Patented Apr. 9, 1957

2,787,896

TORSIONAL VIBRATION DAMPER

Roy A. Jumisco, Detroit, Mich., assignor to General Motors Corporation, Detroit, Mich., a corporation of Delaware Application December 18, 1953, Serial No. 398,966

6 Claims. (Cl. 64—27)

This invention relates generally to machines which employ frictionally engaging drive members and in particular to a device adaptable for use within such machines for preventing backlash or play between such drive members.

In machines driven by gear toothed, splined or other similar drive members and normally having intermittent periods of operation, considerable difficulty is experienced in providing a constant driving force free of the adverse effects of backlash or play between such members. Although such drive means are designed with minimum tolerances between the frictionally engaging drive members continual use causes gradual wear upon the engaging surfaces. Such wear increases the tolerance between the drive members, magnifies the backlash or play permissible and consequently increases the rate of wear and depreciation.

An example of a structure having these difficulties is the gear hobbing machine. The gear hob or cutting member which is secured to a driven shaft intermittently engages a work piece and consequently subjects the driving members to constantly reversing torsional forces. When the gear hob is driven by spline connected drive means, as is quite conventional, there are also space limitations which heretofore have prevented employing any of the known damping or anti-backlash devices. Thus it is readily seen that the nature of the drive employed, particular characteristics of the machine, and the available space within which to incorporate corrective devices all have an influence upon whether or not such devices may be used.

It is now proposed to provide a device which may be readily associated with a gear hobbing machine or other structure to insure a constant driving force between frictionally engaging drive members and to provide for steady engagement between such drive members free of the effects of backlash, play, and the like. The device is adapted to act between the drive members without being secured therebetween. This is accomplished by providing a secondary drive which is disposed apart from the primary drive but is associated with the same driven member. By spring loading the secondary drive, which may be secured at any position along the driven member and near the drive member where space permits, the primary drive is constantly urged in firm engagement with the driven member and backlash or play is prevented. The proposed device may be secured to the ends of parallel drive shafts as shown in the present adaptation of the device and may therefore be added to machines already in operation with a minimum of effort or skill. The device is inexpensive to manufacture, easily attached or removed, and highly efficient in operation.

Figure 2 is taken in the plane of line 2—2 of Figure 3 viewed in the direction of the arrows thereon.

Figure 3 is a front view of the proposed device as taken in the plane of line 3—3 of Figure 2.

Figure 3a is a fragmentary sectioned view through one of the torque applicator means in the plane of 3a—3a of Figure 3 taken in the direction of the arrows thereon.

Figure 4 is an exploded view of a segmental portion of the device shown in Figure 3.

Figure 1:
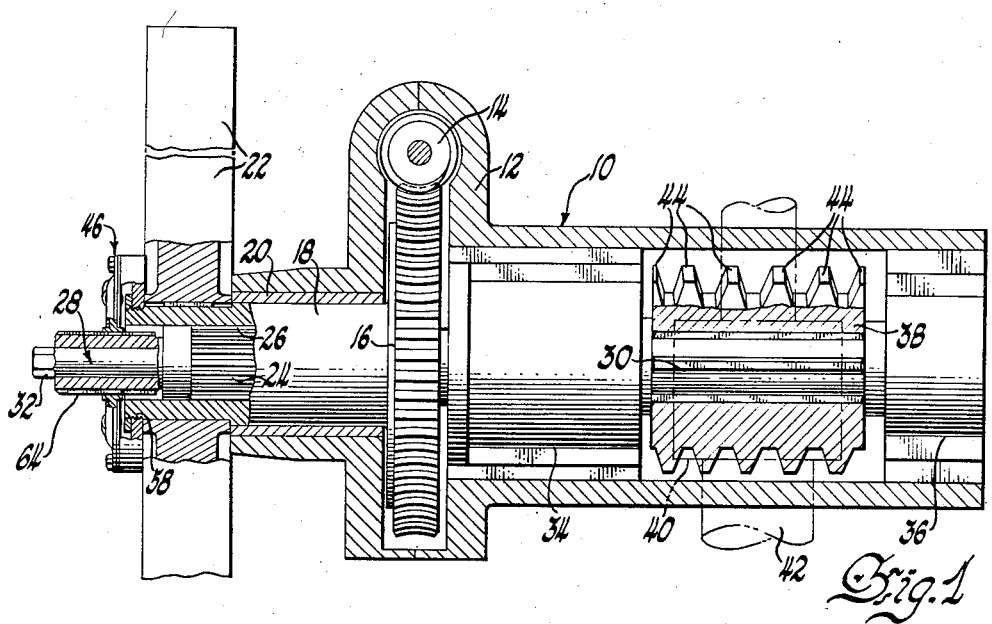
Figure 1 is a cross sectional side elevational view of a part of a gear hobbing machine.

The gear hobbing machine 10 shown in the drawings includes a casing or housing 12. A worm gear 14 is adapted to drive a helical gear 16 which is secured to a tubular shaft 18. The tubular shaft 18 is journalled within the sleeve bearing 20. A flywheel 22 is secured near the outer end of the tubular shaft 18. A spindle 24 is disposed centrally within the tubular shaft 18 and is splined thereto as at 26. A draw bar 28 extends through the spindle 24 and is secured to the hob arbor 30. The outer end of the draw bar 28 is formed with a hexagonal head 32 to enable drawing the bar and the hob arbor 30 into secure engagement with the spindle 24 disposed therebetween. The hob arbor 30 is journalled within bearings 34 and 36 and is adapted to have a gear hob 38 keyed thereto. The work piece 40, shown in phantom, is disposed on a carrier 42 for horizontal rotational movement and is adapted to be engaged by the cutting teeth 44 of the gear hob 36. Thus the driving force transmitted between gears 14 and 16 is conveyed through the splined drive 26 of the tubular shaft 18 to the spindle 24 and the gear hob arbor 30.

A torsional vibration damper or secondary drive device 46 is secured to the ends of the tubular shaft 18 and the spindle 24. The end of the spindle 24 is threaded as at 48 to receive a splined sleeve 50. The draw bar 28 extends through the splined sleeve 50 as through the spindle 24. A collar 52 is formed on the draw bar 28 and is disposed within the splined sleeve 50 to abut against a shoulder 54 formed within the sleeve. A hardened steel washer 56 is disposed between the shoulder 54 and the collar 52. The outer end of the tubular shaft 18 is also threaded as at 58 and adapted to receive an annular retainer plate 60 having a flange 62 formed circumferentially therearound and extending rearwardly away from the flywheel 22.

In mesh with the spline ways 64 of the sleeve 50 is drive plate 66. Annular disks 68 and 70 are disposed on opposite sides of the drive member 66 and are circumferentially secured to the flange 62 of the retainer plate 60 as by bolts or other fastening means 72. The disks 68 and 70 are arranged in spaced relation to the drive plate 66 with their inner peripheral edges riding against friction disks 74 secured on opposite sides of the drive plate. In the present embodiment only the one disk 70 need be cupped as at 76 to accommodate the drive plate 66 between the disks.

Figure 2:
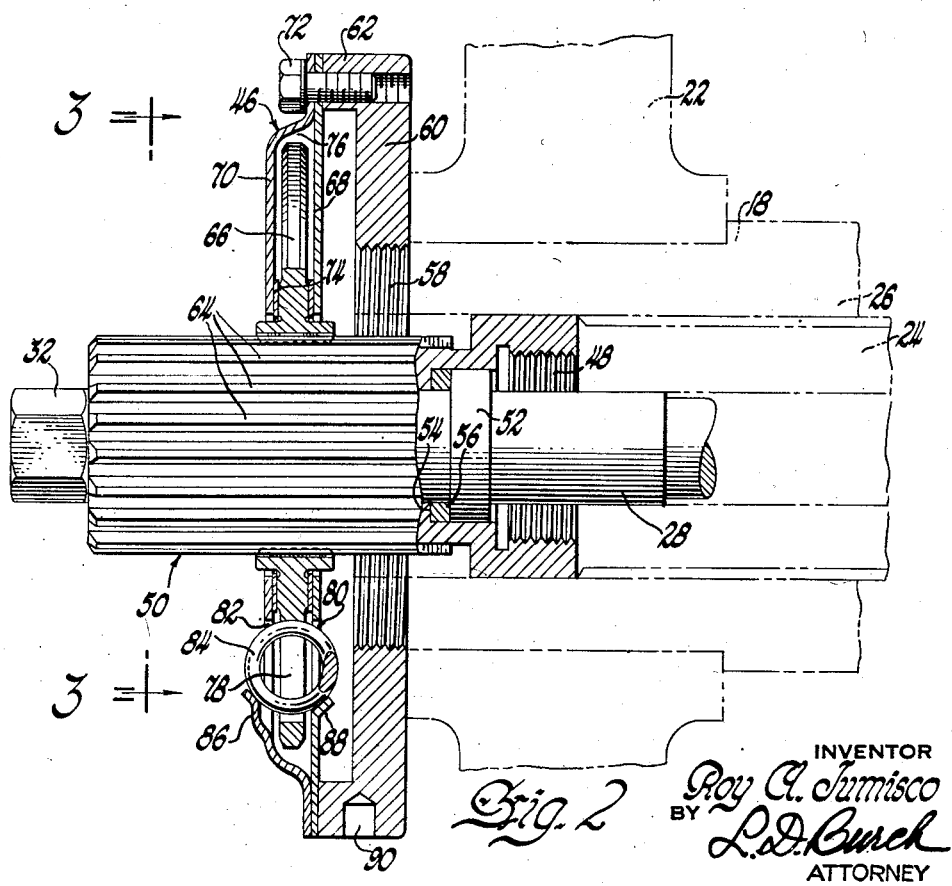
Figure 2 is a side elevational view partially in cross section showing the proposed device adapted for association with a gear hobbing machine.

A plurality of circumferentially spaced openings 78, 80, and 82 are formed through the drive plate 66 and the annular disks 68 and 70 respectively for receiving coil springs 84. Lips or fingers 86 are formed from the disks 68 and 70 and are projected within the openings 80 and 82 by the lips 86 and 88 as shown in Figures 2 and 3. With the dampener device 46 assembled and secured in position for operation the retain plate 60 may be finally balanced as by lighting holes 90 formed within the edge of the plate.

The drive plate 66 is rotated slightly relative to the disks 68 and 70 to compress the springs 84 between the leading edge 92 of the drive plate opening 78 and the trailing edges 94 and 96 of the disk openings 80 and 82, as best seen in Figure 3a, before the disks 68 and 70 are secured to the retainer plate 60. The secondary drive device 46 thus provides a spring loaded driving force for rotating the spindle 24. Since the primary driving force is transmitted through the spline connected tubular shaft 18 and spindle 24 the torsional load imposed by the secondary drive device 46 assists in overcoming any reverse movement within the splined connection 26 and thereby prevents backlash within the primary drive spline connection.

The driving force through the worm and helical gears 14 and 16 remains constant at all times. The intermittent reverse torsional forces caused by the disengagement of the hob cutter teeth 44 from the work piece 40 are absorbed or damped out within the coil springs 84. The driving spline connections 26 and 64 are protected by the absorption of such forces within the coil springs 84. The spring loading may be varied by altering the relative positions of the drive plate 66 to the disks 68 and 70 to assure the elimination of all effects of backlash within the drive connections.

I claim:

1. Torque applicator means for use with machines having drive members spline connected to driven members, and which includes parallel spaced disk members having a plate member disposed therebetween, means securing the outer periphery of said disks together and to a drive member, means securing said plate to said driven member, and means coacting between said disk and plate members for continuously biasing said drive member through said plate in anti-backlashing drive engagement with said driven member.

2. Torque applicator means as provided for by claim 1 which includes offset apertures formed through said disk and plate members and having disposed therein said biasing means which includes a spring member under compression and having one end thereof engaging said disks only and the other end thereof engaging only said plate member.

3. In combination with splined drive means, a torque applicator device for biasing the drive member of said drive means in engagement with the driven member thereof, said device including parallel spaced disk members having a plate member disposed therebetween, means securing the outer periphery of said disks together and to said drive member, means securing said plate to said driven member, and means coacting between said disk and plate members for continuously biasing said drive member through said plate in anti-backlashing drive engagement with said driven member.

4. The combination of said means and device of claim 3 which further includes offset apertures formed through said disk and plate members and having disposed therein said biasing means which includes a spring member under compression and having one end thereof engaging said disks only and the other end thereof engaging only said plate member.

5. In combination with a gear hobbing machine having spline connected gear hob driving means, a torque applicator which includes parallel spaced disk members having a plate member disposed in spaced relation therebetween and secured to one of said driving means, said disk members having their outer peripheries secured together and to the other of said driving means, and means coacting between said disk and plate members for continuously biasing said driving means in drive engagement.

6. In combination with a gear hobbing machine having spline connected gear hob driving means, a shaft extension provided upon the end of a driven member of said driving means, parallel spaced annular disk members secured together at their outer periphery and to a drive member of said driving means, said shaft extension being received centrally through said disk members, an annular plate member connected to said shaft extension and disposed in parallel spaced relation between said disk members, offset apertures formed within said disk and plate members, and spring members under compression disposed within said apertures and having one end thereof engaging said dish members only and the other end thereof only said plate member for continuously biasing said drive member, through said plate member, in anti-backlashing drive engagement with said driven member.

References Cited in the file of this patent
UNITED STATES PATENTS

| | | |
|---|---|---|
| 1,727,153 | Ahlene | Sept. 3, 1929 |
| 1,830,746 | Ahlene et al. | Nov. 10, 1931 |
| 2,042,570 | Wemp | June 2, 1936 |
| 2,176,696 | Wemp | Oct. 17, 1939 |
| 2,521,138 | Waller | Sept. 5, 1950 |